United States Patent [19]

Okubo

[11] Patent Number: 4,540,266

[45] Date of Patent: Sep. 10, 1985

[54] CAMERA IN WHICH EXPOSURE IS ELECTRICALLY AND MECHANICALLY CONTROLLABLE

[75] Inventor: Yuji Okubo, Omiya, Japan

[73] Assignee: Nippon Kogaku K.K., Tokyo, Japan

[21] Appl. No.: 579,375

[22] Filed: Feb. 13, 1984

[30] Foreign Application Priority Data

Feb. 19, 1983 [JP] Japan .................................. 58-25496

[51] Int. Cl.³ .............................................. G03B 7/08
[52] U.S. Cl. ..................................... 354/458; 354/484
[58] Field of Search ..................... 354/456, 458, 234.1, 354/235.1, 258.1, 484

[56] References Cited

U.S. PATENT DOCUMENTS

| | | | |
|---|---|---|---|
| 3,650,193 | 3/1972 | Shimizu | 354/234.1 |
| 3,930,263 | 12/1975 | Urano | 354/258.1 |
| 4,024,553 | 5/1977 | Maitani et al. | 354/258.1 |
| 4,047,211 | 9/1977 | Inoue et al. | 354/258.1 |
| 4,313,660 | 2/1982 | Nakano et al. | 354/234.1 |
| 4,332,452 | 6/1982 | Nakano et al. | 354/234.1 |
| 4,428,655 | 1/1984 | Suzuki et al. | 354/234.1 |

Primary Examiner—Russell E. Adams
Attorney, Agent, or Firm—Shapiro and Shapiro

[57] ABSTRACT

A camera in which exposure is controlled by the supply of power from a power source includes a first control device for electrically controlling the time of the exposure, a second control device for mechanically controlling the time of the exposure, a member for selecting one of the first and second control devices, the member being operable to set the time of the exposure, a device for making a binary code in response to the operating member, the binary code including information indicative of one of the first and second control devices selected by the operating member and information indicative of the time of the exposure set by the operating member, and a device for supplying a power from the power source to the first control device when the binary code indicates that the first control device has been selected by the operating member, the first control device being capable of controlling the time of the exposure when the power supply device supplies a power to the first control device.

10 Claims, 5 Drawing Figures

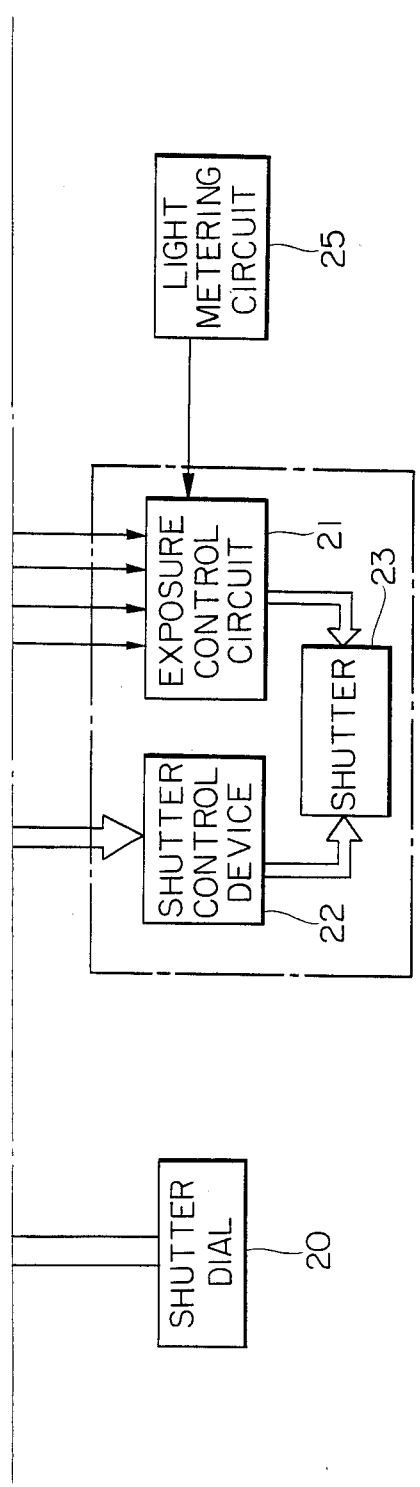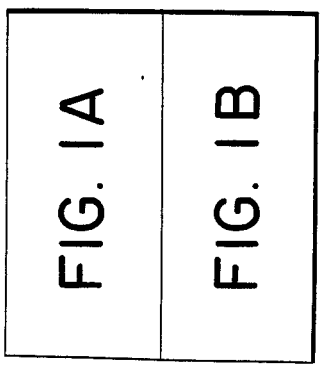

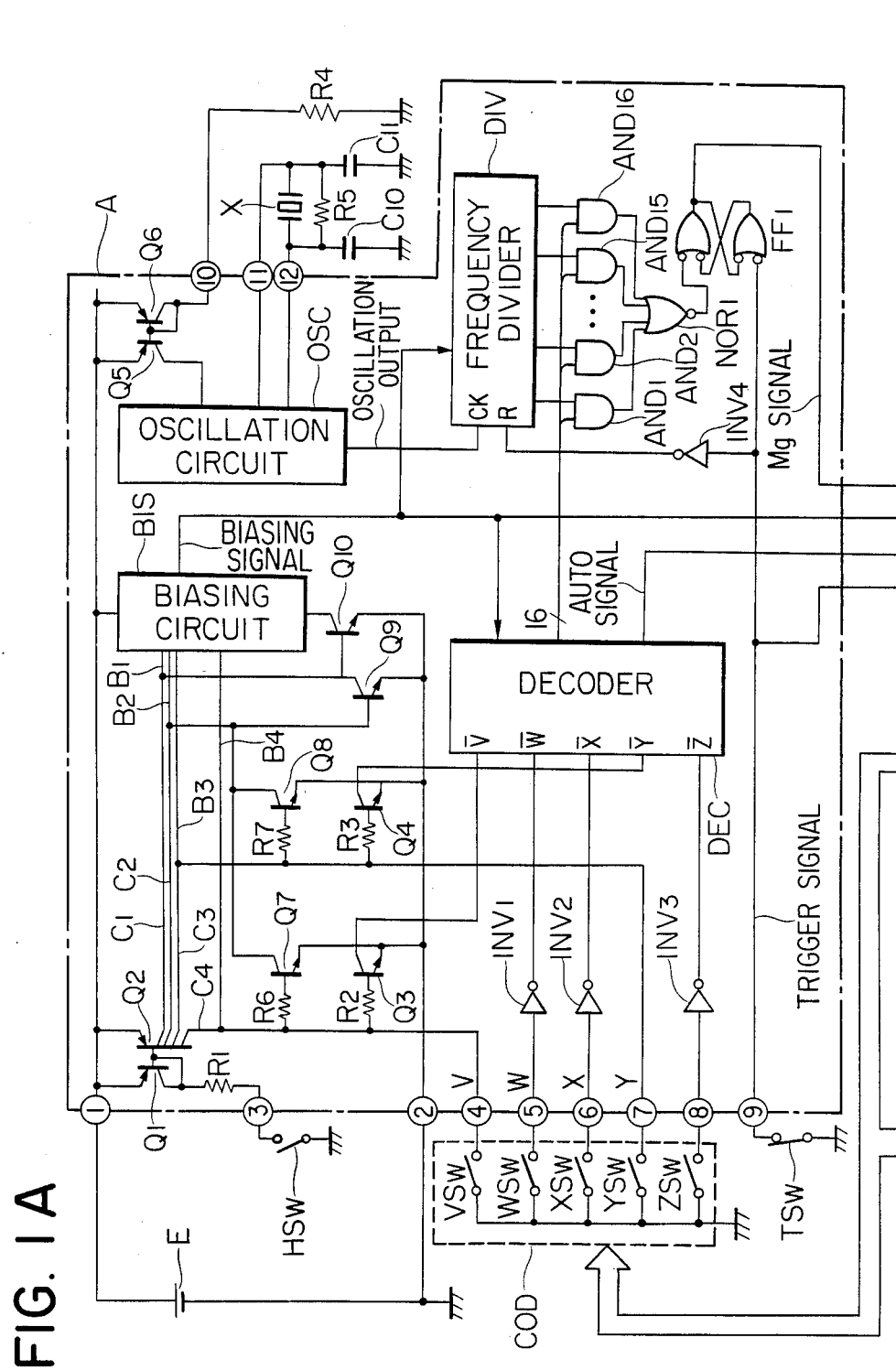
FIG. IA

FIG. 2

| MODE | AUTO MODE | MANUAL MODE | | | | | | | | | | | | | | | | MECHANICAL MODE | |
|---|---|---|---|---|---|---|---|---|---|---|---|---|---|---|---|---|---|---|---|
| SHUTTER TIME | | 1/4000 | 1/2000 | 1/1000 | 1/500 | 1/250 | 1/125 | 1/60 | 1/30 | 1/15 | 1/8 | 1/4 | 1/2 | 1 | 2 | 4 | 8 | 1/250 | B |
| V | * | * | — | — | — | — | * | * | * | * | — | — | — | — | — | — | O | O | O |
| W | — | — | — | — | O | O | O | O | O | O | O | O | — | — | — | — | * | * | * |
| X | O | O | O | O | O | O | O | O | — | — | — | — | — | — | — | — | * | * | * |
| Y | — | — | O | O | O | O | — | — | — | — | O | O | O | O | — | — | O | O | O |
| Z | O | — | — | O | O | O | — | O | O | — | — | O | O | — | — | — | O | * | * |

CAMERA IN WHICH EXPOSURE IS ELECTRICALLY AND MECHANICALLY CONTROLLABLE

BACKGROUND OF THE INVENTION

1. Field of the Invention

This invention relates to a camera in which exposure is electrically and mechanically controllable.

2. Description of the Prior Art

Generally, there are two systems of controlling the shutter blades of a camera, i.e., electrical control by a construction including an electric circuit which requires power supply and mechanical control by a mechanical construction which does not require power supply. In a camera in which both of the above-described two exposure controls are possible, change-over between the mechanical control and the electrical control may be effected, for example, by a mechanical switch exclusively for change-over connected in series with a power source and operatively associated with a shutter dial for setting the shutter time. In the electrical control mode, when the shutter time has been set by the shutter dial, the circuit for the electrical exposure control is supplied with power by the mechanical switch and is operated thereby. On the other hand, in the mechanical control mode, when the shutter time has been set by the shutter dial, the mechanical switch changes over to thereby cut off the power supply to the circuit for the electrical exposure control and exposure is controlled by the mechanical exposure control construction.

However, there are problems such as the wear and tear or destruction of the mechanical switch connected in series with the power source as previously described which may result from the repeated use of the mechanical switch for a long time, and the complication of the construction which results from the mechanical switch being provided in the shutter dial.

SUMMARY OF THE INVENTION

It is an object of the present invention to provide camera provided with an electrical exposure control device which detects which of the electrical exposure control and the mechanical exposure control has been set in accordance with a code pattern selected by an operating member such as a shutter dial and which is operated when the electrical exposure control has been selected.

To achieve the above object, a camera in accordance with the present invention is provided with a power source, an electrical exposure control device supplied with power from the power source and electrically controlling exposure, a mechanical exposure control device for mechanically controlling exposure, and a photographic information setting device having a code pattern selected by an operating member and reading the photographic information to be set from the selected code pattern and transmitting this information as a digital signal to the electrical exposure control device. The camera further provided with a power supply control device for detecting which of the electrical exposure control and the mechanical exposure control has been selected and permitting power supply from the power source to the electrical exposure control device when the electrical exposure control has been selected.

The invention will become more fully apparent from the following detailed description thereof taken in conjunction with the accompanying drawings.

BRIEF DESCRIPTION OF THE DRAWINGS

FIG. 1 composed of FIGS. 1A and 1B, shows an embodiment of the present invention.

FIG. 2 shows binary codes generated by switches VSw, WSw, XSw, YSw and ZSw shown in FIG. 1.

FIG. 3 is a perspective view showing the structures of the switches VSw, WSw, XSw, YSw and ZSw operatively associated with a shutter dial.

DESCRIPTION OF THE PREFERRED EMBODIMENT

An embodiment of the present invention will hereinafter be described by reference to the drawings. FIG. 1 shows a circuit of the embodiment of the present invention.

A power source E supplies power to the entire circuit through the terminals 1 and 2 of an integrated circuit (IC) A. An exposure control device includes a shutter 23, an exposure control circuit 21 for electrically controlling the shutter 23 in response to signals from the integrated circuit A, and a shutter control device 22 for mechanically controlling the shutter 23 in response to a shutter dial 20. Movement of the forward curtain of the shutter 23 is always mechanically effected and movement of the rearward curtain of the shutter 23 is electrically or mechanically effected. A switch HSw is closed in response to half-depression of a shutter release button and current flows from power source E through a transistor $Q_1$ which is turned on at this time, a resistor $R_1$ and the switch HSw. The same current as the current flowing to the transistor $Q_1$ flows to a multicollector transistor $Q_2$ and current also flows to collectors $C_1$–$C_4$. A switch group COD comprising switches VSw, WSw, XSw, YSw and ZSw conceptually indicative of the pattern of a gray code selected by the shutter dial 20, inverters $INV_1$–$INV_3$, transistors $Q_3$ and $Q_4$, resistors $R_2$ and $R_3$ and a decoder DEC together constitute a photographic information setting device. The switch group COD produces a binary code pattern signal output shown in FIG. 2 by the terminals V, W, X, Y and Z thereof sliding on a code plate 30 rotating in response to the shutter dial 20, as shown in FIG. 3. The surface of the code plate 30 in FIG. 3 is insulated and a grounded conductor 31 forms thereon a pattern corresponding to the binary code. In FIG. 2, as regards the exposure control modes, the auto and manual modes included in the mode for electrically controlling the exposure (hereinafter referred to as the electrical exposure control mode) and the mechanical mode included in the mode for not electrically but mechanically controlling the exposure (hereinafter referred to as the mechanical exposure control mode) can be set by the shutter dial 20. In the auto mode, the shutter time is automatically set to a value for obtaining proper exposure. In the manual mode, the shutter times from 1/4000 sec. to 8 sec. can be set in conformity with the rotated position of the shutter dial. In the mechanical mode, the shutter times of 1/250 sec. and the bulb (hereinafter referred to as B) in which the shutter is open as long as the shutter release button is depressed can be set. V, W, X, Y and Z correspond to the switches VSw, WSw, XSw, YSw and ZSw, respectively, and "1" and "0" indicate the signals when the switches are "OFF" and "ON", respectively. "*" is indefinite and indicates a signal which may be "1" or "0". Also, "1" corresponds to a high level signal (hereinafter referred to as the H level) and "0" corresponds to a low level signal (hereinafter referred to as the L level). The inverters $INV_1$-$INV_3$ invert the signals of the switches WSw, XSw and ZSw and transmit them to the decoder DEC. The transistors $Q_3$ and $Q_4$ are supplied with a current from the collectors $C_4$ and $C_3$ of the transistor $Q_2$ through the resistors $R_2$ and $R_3$. When, in this state, the switches VSw and YSw are closed, the transistors $Q_3$ and $Q_4$ become non-conductive and, when the switches VSw and YSw are opened, the transistors $Q_3$ and $Q_4$ become conductive. That is, the transistors $Q_3$ and $Q_4$ invert the output signals (binary codes) of the switches VSw and YSw and transmit them to the decoder DEC. The decoder DEC, in accordance with the output signals of the inverted and transmitted binary codes of the switch group COD, transmits an auto signal to the exposure control circuit 21 when the auto mode is set, and thereby indicates that the shutter dial has been set to the automatic exposure control. Thereby, the control circuit 21 controls the shutter time on the basis of the metering output from a metering circuit 25. Also, when any shutter time of the manual exposure control has been set by the shutter dial 20, an H level output is imparted to any one of AND gates $AND_1$-$AND_{16}$. The AND gates $AND_1$-$AND_{16}$ correspond to any of the shutter times in the manual mode, and the AND gate to which an H level output has been applied from the decoder DEC corresponds to the set shutter time. That is, the kinds of the shutter times in the manual mode agree with the number of the AND gates. Accordingly, since the shutter times in the manual mode are sixteen kinds, the number of the AND gates is sixteen. The AND gates $AND_1$-$AND_{16}$ receive as inputs signals from the decoder DEC through discrete lines, respectively. An oscillation circuit OSC, transistors $Q_5$, $Q_6$, a resistor $R_4$, a rock crystal vibrator X, a resistor $R_5$ and capacitors $C_{10}$, $C_{11}$ together constitute a crystal oscillation device. The same current as the current flowing to the transistor $Q_6$ and the resistor $R_4$ flows to the oscillation circuit OSC through the transistor $Q_5$ and biases this oscillation circuit. The crystal vibrator X, the resistor $R_5$ and the capacitors $C_{10}$, $C_{11}$ determine the oscillation frequency of the oscillation device. The oscillation circuit OSC produces a clock oscillation output signal at the frequency thus determined. Transistors $Q_7$, $Q_8$, $Q_9$, $Q_{10}$ and resistors $R_6$, $R_7$ together constitute a power supply control circuit. The transistor $Q_7$ is supplied with a current from the transistor $Q_2$ through the resistor $R_6$, and is adapted to become conductive when the switch VSw is open and to become non-conductive when the switch VSw is closed. The transistor $Q_8$ is supplied with a current from the transistor $Q_2$ through the resistor $R_7$, and is adapted to become conductive when the switch YSw is open and to become non-conductive when the switch YSw is closed. The bases of the transistors $Q_9$ and $Q_{10}$ are supplied with a current from the collectors $C_2$ and $C_1$, respectively, of the transistor $Q_2$, and when both of the transistors $Q_7$ and $Q_8$ have become non-conductive, the transistor $Q_9$ becomes conductive and the transistor $Q_{10}$ becomes non-conductive. It is when both of the switches VSw and YSw are closed that both of the transistors $Q_7$ and $Q_8$ become conductive, and as is apparent from FIG. 2, it is only when the mechanical mode has been set. When the auto mode and manual mode which are the other electrical exposure control modes have been set, as is apparent from FIG. 2, one of the switches VSw and YSw is opened without fail and therefore, one of the transistors $Q_7$ and $Q_8$ becomes conductive, the transistor $Q_9$ becomes non-conductive and the transistor $Q_{10}$ becomes conductive. A bias control circuit BIS, a frequency dividing circuit DIV, AND gates $AND_1$-$AND_{16}$, a NOR gate $NOR_1$, a flip-flop $FF_1$, an inverter $INV_4$ and a switch TSw are designed to electrically control the exposure control circuit 21. The switch TSw changes over from its ON position to its OFF position during the movement of the forward curtain of the shutter 23 when the shutter is released, and changes over to its ON position after the completion of the movement of the rearward curtain of the shutter 23. The signal during the change-over of the switch TSw from its ON position to its OFF position is transmitted as a trigger signal to the exposure control circuit 21. Also, by the ON position of this switch TSw, the flip-flop $FF_1$ is reset and the frequency divider DIV also is reset through the inverter $INV_4$. Subsequently, when the switch TSw changes over to its OFF position, the resetting of the frequency dividing circuit DIV and the flip-flop $FF_1$ is released. After the resetting of the frequency dividing circuit DIV has been released, the frequency dividing circuit DIV counts the clock signal output of the oscillation circuit OSC and with lapse of time, it applies an H level output to the AND gates $AND_1$-$AND_{16}$ which correspond to the respective shutter times. An H level output is applied also from the decoder DEC to one of the AND gates $AND_1$-$AND_{16}$ which corresponds to the set shutter time. Accordingly, when the set shutter time has elapsed, the gate which corresponds to that shutter time produces an H level output and the output of the NOR gate $NOR_1$ becomes L, and the flip-flop $FF_1$ is set and produces an Mg signal. This Mg signal is transmitted to the exposure control circuit 21, which in turn operates a magnet for restraining the rearward curtain of the shutter 23 and causes the rearward curtain to move. Next, when the transistor $Q_{10}$ is conductive, that is, when the electrical exposure control mode has been set, the bias circuit BIS is operated by being supplied with power from the power source E and imparts a bias signal to the decoder DEC, the frequency dividing circuit DIV and the exposure control device 21 and effects the power supply to those circuits to operate those circuits or render those circuits operative. The mode in which the shutter 23 is thus controlled by the exposure control circuit 21 is the electrical exposure control mode.

Also, at this time, the bias circuit BIS supplies current from the power source to lines $B_1$-$B_4$ through itself for a predetermined time even if the switch HSw changes over from its ON position to its OFF position and the transistors $Q_1$ and $Q_2$ become non-conductive. Therefore, during that time, the conductive state of the transistor $Q_{10}$ is maintained and the bias circuit BIS operates and continues to produce the bias signal. That is, even if the finger is released from the shutter release button in its half-depressed state, power may be supplied to the bias circuit for a predetermined time after that. Next, when the transistor $Q_{10}$ is non-conductive, the bias circuit BIS does not produce the bias signal and the power supply to the decoder DEC, the frequency dividing circuit DIV and the exposure control circuit 21 is not effected and thus, these circuits do not operate. The power source E, the switches HSw, TSw, the switch group COD, the resistor $R_4$, the crystal vibrator X, the resistor $R_5$ and the capacitors $C_{10}$, $C_{11}$ are connected to the integrated circuit A through terminals 1–12.

Operation will now be described.

(1) A case will first be described where the auto mode of the electrical exposure control mode has been set by the shutter dial. In this case, in the switch group COD, as is apparent from FIG. 2, the switch VSw is ON or OFF (indefinite), the switch WSw is OFF, the switch XSw is ON, the switch YSw is OFF and the switch ZSw is ON. Accordingly, when the shutter release button is half-depressed, both of the transistors $Q_7$ and $Q_3$ become conductive or non-conductive (namely, indefinite) and both of the transistors $Q_8$ and $Q_4$ become conductive, and the signals of the switches VSw and YSw are inverted and applied as inputs to the decoder DEC. The inverters $INV_1$, $INV_2$ and $INV_3$ also invert the signals of the switches WSw, XSw and ZSw, respectively, and apply them as inputs to the decoder DEC. At this time, the transistor $Q_8$ is conductive without fail and therefore, the transistor $Q_9$ becomes non-conductive and the transistor $Q_{10}$ becomes conductive and thus, power supply from the power source E to the bias circuit BIS takes place. Accordingly, the bias circuit BIS imparts the bias signal to the decoder DEC, the frequency dividing circuit DIV and the exposure control circuit 21 and supplies power to these, thereby operating these circuits or rendering these circuits operative. At this time, the decoder DEC imparts an auto signal to the exposure control circuit 21. When, in this state, the shutter release button is further depressed from its half-depressed state (that is, fully depressed), the forward curtain of the shutter 23 moves and in synchronism therewith, the switch TSw changes over to its OFF position and a trigger signal is applied to the exposure control circuit 21. The exposure control circuit 21 deenergizes a magnet (not shown) for restraining the rearward curtain of the shutter so that a proper exposure time corresponding to the then brightness of the object to be photographed may be obtained, and causes the rearward curtain of the shutter to move. In this manner, automatic exposure control is accomplished.

(2) A case will now be described. any one of the manual shutter times of the electrical exposure control mode has been set by the shutter dial. As previously described, the AND gates $AND_1$–$AND_{16}$ individually correspond to the shutter times. In the present embodiment, the AND gates $AND_1$–$AND_{16}$ correspond to the shutter times of 1/4000 sec.–8 sec. in the order of $AND_1$–$AND_{16}$. In this case, as is apparent from FIG. 2, one of the switches VSw and YSw is OFF ("1" in FIG. 2) without fail and therefore, when the shutter release button is half-depressed, one of the transistors $Q_7$ and $Q_8$ becomes conductive without fail, the transistor $Q_9$ becomes non-conductive and the transistor $Q_{10}$ becomes conductive, whereby power supply to the bias circuit BIS takes place. As a result, the bias circuit BIS imparts a bias signal to the decoder DEC, the frequency dividing circuit DIN and the exposure control circuit 21, thereby operating these circuits or rendering these circuits operative. As an example, let it be assumed that 8 sec. has been selected as the shutter time by the shutter dial and that the AND gate corresponding to this shutter time is $AND_{16}$. In this case, as is apparent from FIG. 2, the switch VSw is ON, the switch WSw is OFF, the switch XSw is OFF, the switch YSw is OFF and the switch ZSw is OFF. The signals of these switches are inverted and transmitted to the decoder DEC, which thus imparts an H level output only to the gate $AND_{16}$ corresponding to the set shutter time. When the shutter release button is further depressed from its half-depressed state and shutter release is effected, the forward curtain of the shutter moves while, at the same time, the switch TSw changes over from its ON position to its OFF position and the resetting of the frequency dividing circuit DIV and the flip-flop $FF_1$ is released by a trigger signal. The frequency dividing circuit DIV frequency-divides the clock pulse put out by the crystal oscillation device and produces an H level output in succession from $AND_1$ to $AND_{16}$. Accordingly, when 8 seconds has elapsed after the generation of the trigger signal, an H level output is imparted from the frequency dividing circuit DIV to the AND gate $AND_{16}$ corresponding to this shutter time, and the output of the AND gate $AND_{16}$ assumes an H level and the output of the NOR gate $NOR_1$ assumes an L level, thus setting the flip-flop $FF_1$. Accordingly, the flip-flop $FF_1$ imparts an Mg signal to the exposure control circuit 21, which thus deenergizes the magnet (not shown) for restraining the rearward curtain to cause the rearward curtain of the shutter to move. In this manner, manual exposure control is accomplished at the shutter time selected by the shutter dial. Also, when the shutter time has been set to 1/4000 sec., the decoder DEC imparts an H level output only to the AND gate $AND_1$, and when the shutter time has been set to 1/2000 sec., the decoder DEC imparts an H level output only to the AND gate $AND_2$.

(3) A case will now be described where 1/250 sec. which is the shutter time of the mechanical exposure control mode or the bulb B has been set by the shutter dial. In this case, as is apparent from FIG. 2, both of the switches VSw and YSw are ON and therefore, even if the shutter release button is half-depressed, both of the transistors $Q_7$ and $Q_8$ are non-conductive, the transistor $Q_9$ becomes conductive and the transistor $Q_{10}$ becomes non-conductive. Accordingly, power supply from the power source E to the bias circuit BIS is inhibited (does not take place) and the bias circuit BIS does not produce a bias signal. As a result, power is not supplied from the power source E to the decoder DEC, the frequency dividing circuit DIV and the exposure control circuit 21 (power supply is inhibited) and thus, these circuits do not operate. When, in this state, the shutter release button is depressed, the forward and rearward ourtains of the shutter 23 are controlled by the shutter control device 22 without requiring electricity, and photography is effected at the shutter time of 1/250 sec. when 1/250 sec. is selected by the shutter dial, and photography is effected at the bulb in response to the shutter release button when B is selected by the shutter time setting dial. In this manner, exposure time control is effected by the shutter control device 22 which does not require the power supply. Of course, in the case of the present embodiment, if the mechanical mode is selected by the shutter dial, power is not supplied to the bias circuit BIS, the exposure control circuit 21, etc. when the power source E has been consumed, and photography can be accomplished at the shutter time of 1/250 sec. or at the bulb by the above-described mechanical construction.

In the present embodiment, the code pattern itself is provided so as to be capable of distinguishing between the electrical exposure control and the mechanical exposure control. That is, the code pattern is provided so that at least one of the switches VSw and YSw is opened in the case of the electrical exposure control and therefore, the construction of the circuit in the power supply control device for detecting which control state has been set from the code pattern becomes simpler.

Where the code pattern itself is formed without being endowed with the regularity as described above, the construction of the circuit for detecting which control state has been set from this code pattern becomes very complex, but the present invention may also be used.

In the present embodiment, power can be supplied to the crystal oscillation device at all times through the common terminals 1 and 2 and power can be supplied to the electrical exposure control device (by the power supply control circuit) as required. Accordingly, the connection terminals connected to the power source E can be made common to thereby decrease the number of terminals.

Further, according to the present embodiment, the power supply control device is provided in the integrated circuit with the circuits (e.g., BIS and DIV) included in the electrical exposure control device and therefore, it is easy to make the power supply control device.

Also, embodiments have hitherto been described using a shutter dial which can set the manual shutter time, but the present invention may also use a shutter dial which cannot set the manual shutter time. In that case, the shutter time of the auto mode and the shutter time of the mechanical mode can be selected by the shutter dial.

I claim:

1. A camera controlling exposure, said camera comprising:
   (a) first control means for electrically controlling the time of said exposure;
   (b) power supply means for supplying power to said first control means, said first control means being capable of controlling the time of said exposure when said power supply means supplies power to said first control means;
   (c) second control means for mechanically controlling the time of said exposure;
   (d) an operating member for selecting one of said first and second control means, said operating member being operable to set the time of said exposure;
   (e) means for producing a binary code in response to said operating member, said binary code including information indicative of one of said first and second control means selected by said said operating member and information indicative of the time of said exposure set by said operating member; and
   (f) inhibition means for inhibiting said power supply means from supplying power to said first control means in response to said binary code indicative of said second control means selected by said operating member.

2. A camera according to claim 1, wherein said binary code producing means includes binary signal generating means which puts out a plurality of binary signals as said binary code in parallel.

3. A camera according to claim 2, wherein said binary signal generating means includes a plurality of switch means.

4. A camera according to claim 1, further including: a crystal oscillator normally supplied with power from said power source, said crystal oscillator putting out a predetermined frequency signal to said first control means.

5. A camera according to claim 1, wherein said power supply means includes means for detecting on the basis of said binary code which of said first and second control means has been selected by said operating member.

6. A camera controlling exposure, said camera comprising:
   (a) first control means for electrically controlling said exposure;
   (b) power supply means for supplying power to said first control means, said first control means being capable of controlling said exposure when said power supply means supplies power to said first control means;
   (c) second control means for mechanically controlling said exposure;
   (d) an operating member operable to selectively operate said first and second control means;
   (e) means for generating exposure information for determining said exposure, in response to said operating member, said exposure information indicating one of said first and second control means selected by said operating member; and
   (f) inhibition means for inhibiting said power supply means from supplying power to said first control means in response to said exposure information indicative of said second control means selected by said operating member.

7. A camera according to claim 6, wherein said exposure information generating means includes means which puts out a plurality of binary signals as said exposure information in parallel.

8. A camera according to claim 6, wherein said first control means controls the time of said exposure on the basis of said exposure information.

9. A camera according to claim 6, wherein said second control means controls the time of said exposure in response to said operating member.

10. A camera controlling exposure, said camera comprising:
    (a) first control means for electrically controlling the time of said exposure;
    (b) bias means for biasing said first control means, said first control means being capable of controlling the time of said exposure in response to said bias by said bias means;
    (c) power supply means for supplying power to said bias means, said bias means biasing said first control means when said power supply means supplies power to said bias means;
    (d) second control means for mechanically controlling the time of said exposure;
    (e) an operating member for selecting one of said first and second control means, said operating member being operable to set the time of said exposure;
    (f) means for producing a binary code in response to said operating member, said binary code including information indicative of one of said first and second control means selected by said operating member and information indicative of the time of said exposure set by said operating member; and
    (g) inhibition means for inhibiting said power supply means from supplying power to said bias means in response to said binary code indicative of said second control means selected by said operating member.

* * * * *